United States Patent Office 2,775,428
Patented Dec. 25, 1956

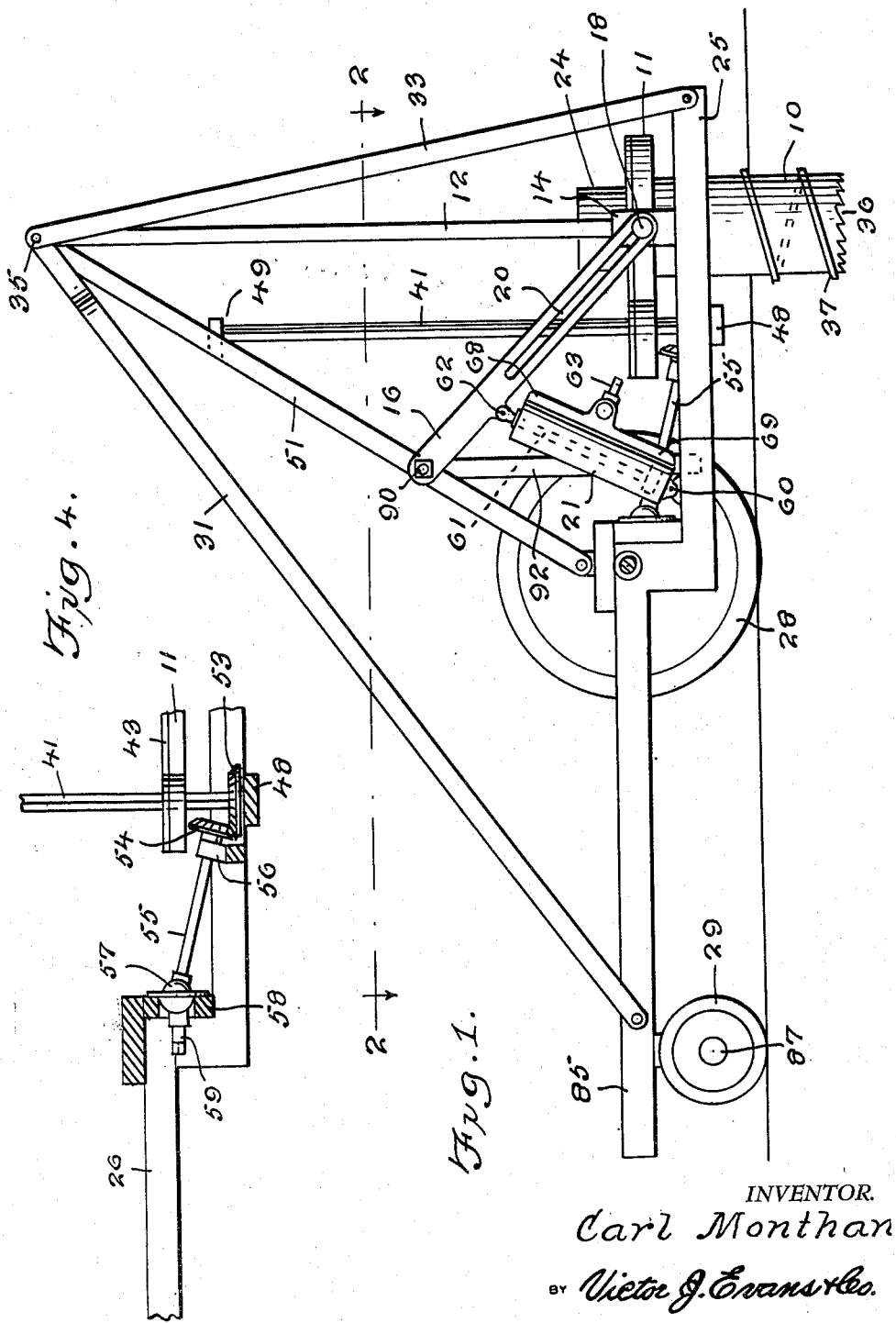

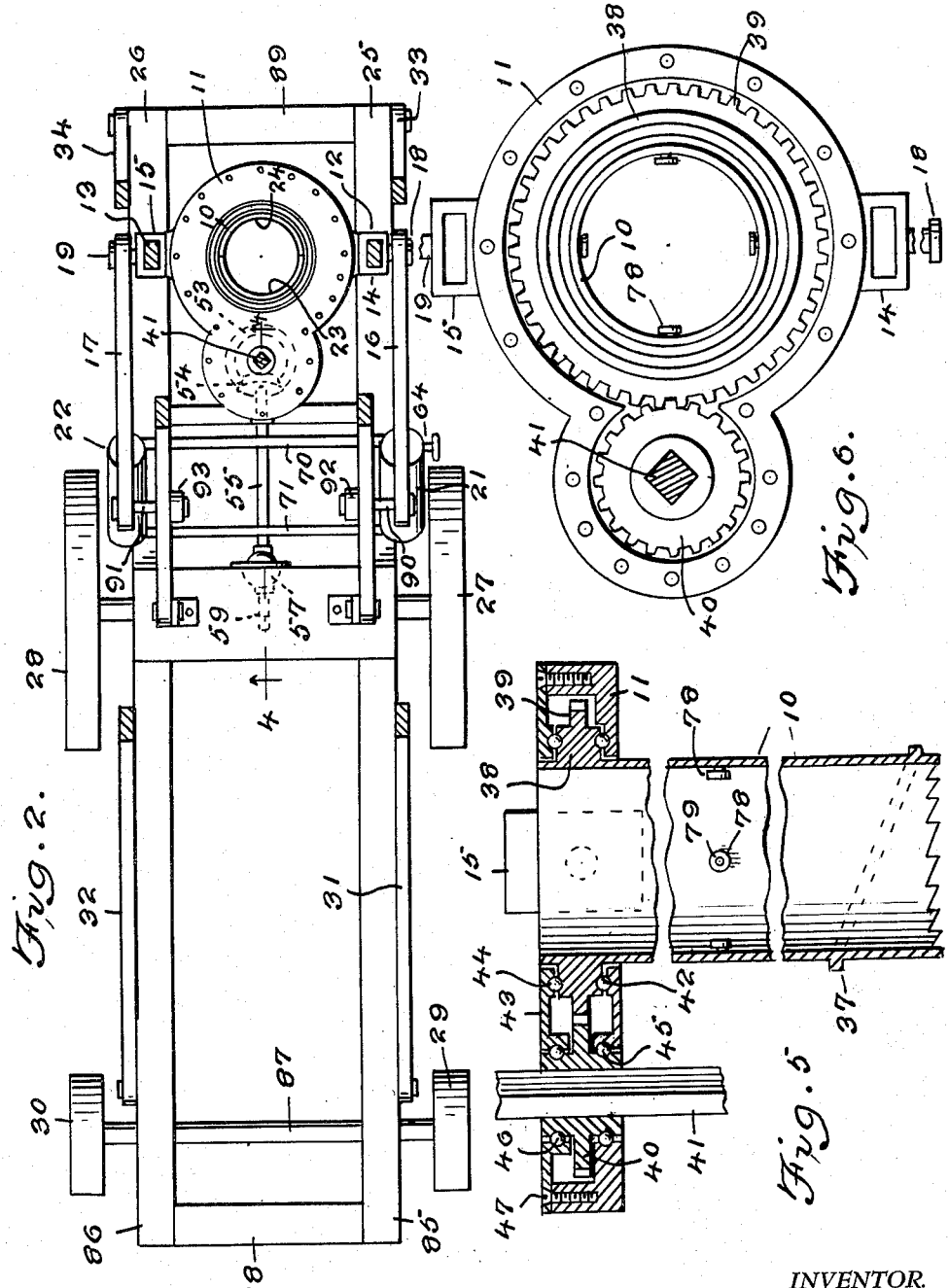

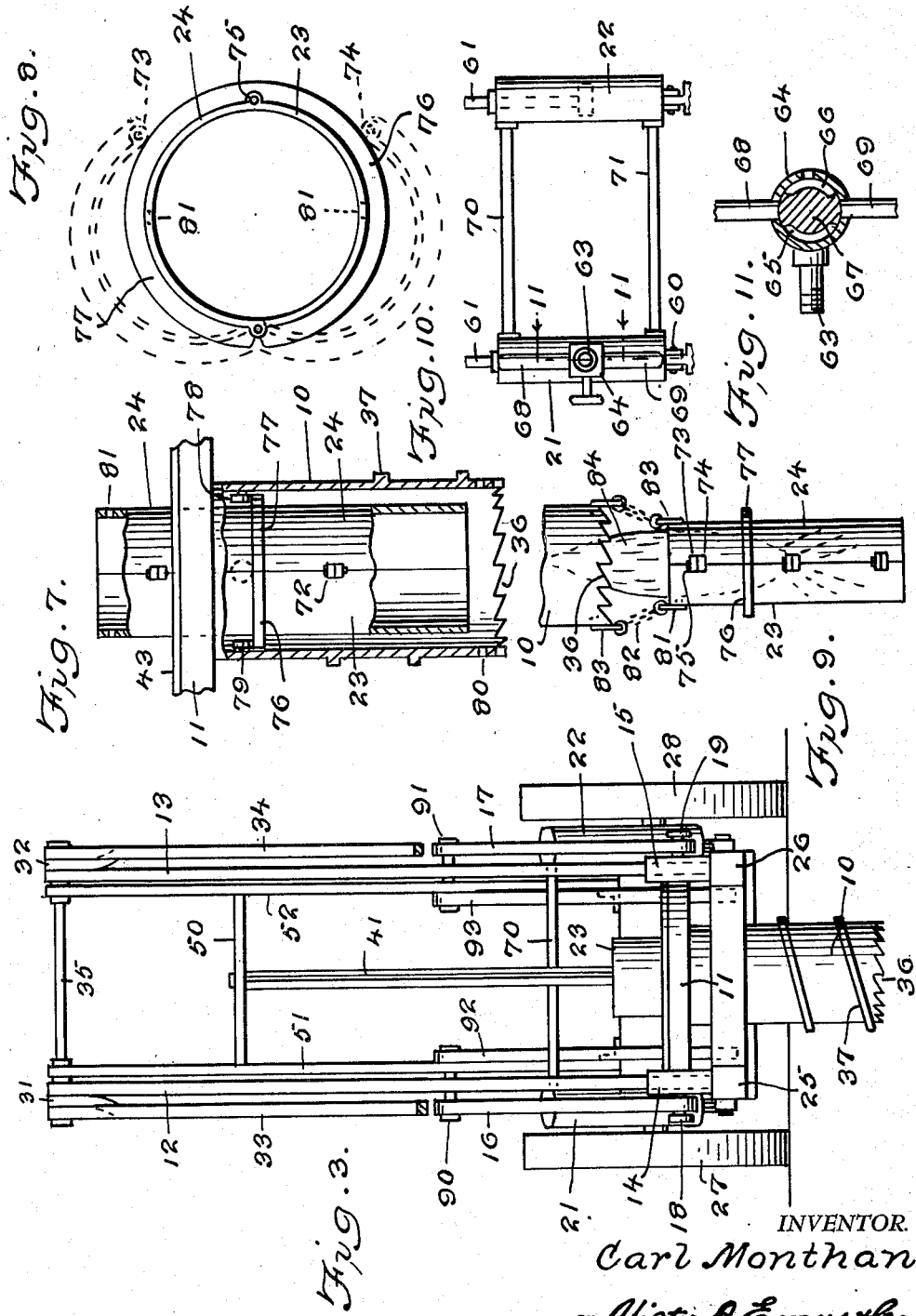

2,775,428
TREE AND SHRUB FIELD BALLING MACHINE

Carl Monthan, Tucson, Ariz.

Application May 19, 1953, Serial No. 355,983

5 Claims. (Cl. 255—19)

This invention relates to devices for handling nursery stock, and in particular a machine for boring a cylindrical opening in the ground around trees, shrubs, and the like wherein with a sleeve inserted in the cylindrical opening in the soil around the roots of a tree or shrub is removed with the roots and the complete assembly including the roots, tree, and surrounding soil is adapted to be balled by sewing burlap or the like around the assembly of the roots and soil with the shell or inner casing removed.

The purpose of this invention is to facilitate shipping trees, shrubbery, and the like from nursery stock and to make it possible to ball the roots without removing soil therefrom.

Various devices have been provided for retaining soil around roots of trees, shrubbery and the like to prevent damaging the small feelers or branches of the roots, however, the use of such devices, and particularly where cylindrical shells are forced into the ground around the tree or shrub is not adapted for use in many localities in the west where the coil is comparatively hard. With this thought in mind this invention contemplates a tree and shrub balling machine wherein an outer shell, with a screw thread on the outer surface and cutting teeth on the lower edge is actuated, similar to a boring tool wherein a cylindrical opening is provided around a tree or shrub and wherein a sleeve may be inserted in the cylindrical opening for retaining the soil in contact with the roots as the tree or shrub is removed.

The object of this invention is, therefore, to provide means for operating a cylindrical shell whereby with the shell inserted into the soil around a tree, shrub, or the like an inner shell or casing may be positioned around the soil and roots of the tree or shrub whereby in removing the outer shell and casing the tree or shrub is removed with the soil remaining in contact with the roots thereof.

Another object of the invention is to provide a machine for removing trees, shrubbery and the like from the ground for balling in which the device is adapted to be operated by a tractor to which it may be attached and in which the device may be used without damaging surrounding trees or shrubs.

A further object of the invention is to provide a balling machine for trees, shrubbery and the like in which the machine is of a simple and economical construction.

With these and other objects and advantages in view the invention embodies a substantially horizontally disposed frame having a cylinder in the form of an auger mounted therein and adapted to extend downwardly therefrom, means for rotating the cylinder from the power take-off of a tractor to which the device may be attached, an inner shell adapted to extend downwardly through the cylindrical casing anud means for withdrawing the cylindrical casing and shell with a tree or the like in the shell.

Other features and advantages of the invention will appear from the following description taken in connection with the drawings, wherein:

Figure 1 is a side elevational view of the tree and shrubbery balling machine showing a cylindrical casing or auger extended downwardly from a frame thereof.

Figure 2 is a sectional plan through the upper part of the machine taken on line 2—2 of Fig. 1.

Figure 3 is an end elevational view of the plant and shrubbery balling machine, also with the parts as shown in Fig. 1.

Figure 4 is a longitudinal sectional view taken on line 4—4 of Fig. 2 illustrating a connection from the power taken-off of a tractor or the like to a vertically positioned operating shaft of the device.

Figure 5 is a vertical section through the upper end of the cylinder showing the mounting of the gear housing thereon.

Figure 6 is a sectional plan through the gear housing shown in Fig. 5 with the upper cover plate of the housing removed.

Figure 7 is a side elevational view of the lower part of the boring cylinder with parts broken away and shown in section and illustrating the position of the inner shell in the cylinder.

Figure 8 is a plan view of the inner shell illustrating the construction thereof wherein the shell is formed of complimentary semi-circular sections, the sections being hinged together at one side and secured by a pin at the opposite side.

Figure 9 is a side elevational view with parts shown on a reduced scale, illustrating the connection of the lower end of the boring cylinder to the inner shell, and showing a tree positioned in the shell.

Figure 10 is a side elevational view illustrating the connections between a pair of hydraulic cylinders which are mounted on the frame of the machine and positioned to move the boring cylinder vertically.

Figure 11 is a vertical section taken on line 11—11 of Fig. 10 illustrating a valve for controlling the flow of fluid under pressure to the cylinder.

Referring now to the drawings wherein like reference characters denote corresponding parts the improved tree and shrubbery balling machine of this invention includes a cylinder 10 having a gear housing 11 extended around the upper end and in which the cylinder is journaled, vertically disposed bars 12 and 13 on which the cylinder and gear housing are slidably mounted with bearings 14 and 15, respectively, levers 16 and 17 for actuating the cylinder on the bars 12 and 13 through trunions 18 and 19 which extend through slots 20 in the levers, hydraulic cylinders 21 and 22 for actuating the levers, an inner shell formed of sections 23 and 24 adapted to be actuated in the cylinder 10, a frame having side beams 25 and 26 mounted on wheels 27 and 28, respectively at one end, and wheels 29 and 30 at the opposite end and transmission means for rotating the cylinder 10 from the power take-off of a tractor or the like to which the machine is attached.

The lower ends of the bars 12 and 13 are mounted on the beams 25 and 26, respectively and the upper ends are supported with braces 31 and 32 and links 33 and 34, the upper ends of the braces, links, and bars being secured together with a tie rod 35.

The cylinder 10 is provided with cutting teeth 36 on the lower end and a spiral strip 37 positioned on the outer surface provides a screw action wherein upon rotation of the cylinder the cutting teeth cut into the ground and the thread 37 drives the cylinder downwardly with the thread also working the soil upwardly, removing the soil from the annular opening formed by the cylinder.

The upper end of the cylinder is provided with a ring 38 on the outer surface of which is a gear 39 and, as illustrated in Figs. 5 and 6 the gear 39 meshes with a pinion 40 on a shaft 41 which, in the design shown, is illustrated as being square, although it will be understood that the shaft may be splined or keyed or otherwise formed whereby the gear 40 is adapted to slide thereon. The gear 38 is journaled in the housing 11 with a ball bearing 42 and in the cover plate 43 of the gear housing with a ball bearing 44. The pinion 40 is journaled in the housing 11 with a ball bearing 45 and in the cover 43 with a bearing 46. The cover plate 43 is secured to the housing with screws 47.

The lower end of the vertically disposed square or splined shaft 41 is supported by and rotatably mounted in a cross bar 48 carried by the side beams 25 and 26 at the lower end and in a bearing 49 in a cross bar 50 which is extended between struts 51 and 52 at the upper end. The shaft 41 is provided with a beveled gear 53 that meshes with a beveled pinion 54. The pinion 54 is mounted on a stub shaft 55. The stub shaft 55 is rotatably mounted at one end in a bearing 56. The pinion 54 is positioned at one end of the bearing. The shaft 55 is provided with a universal joint 57 that is mounted in a cross member 58 of the frame of the machine. The universal joint 57 is provided with a stub shaft 59 by which it may be connected to the power take-off of a towing vehicle or tractor, however, it will be understood that the shaft 41 may be rotated by other suitable means.

The cylinder 10 is raised and lowered by the hydraulic or pneumatic cylinders 21 and 22 and, as illustrated in Fig. 1 the lower ends of the cylinders are pivotally connected by pins 60 to the side beams 25 and 26 and connecting rods 61 which extend from the upper ends of the cylinders are pivotally connected by pins 62 to the levers 16 and 17. The cylinders are actuated by fluid under pressure which is supplied through a tube or hose 63, the tube being connected to a valve 64 which, as illustrated in Fig. 11 is provided with passages 65 and 66 in a core 67 whereby fluid under pressure may be admitted to tubes 68 and 69 alternately and with the tubes extending through upper and lower ends of the cylinders the levers 16 and 17 may be driven upwardly or drawn downwardly when it is desired to force the cylinder 10 into the ground. The upper ends of the cylinders 21 and 22 are connected with a cross tube 70 and the lower ends are connected with a similar tube 71 whereby both cylinders operate in unison to elevate or lower the cylinder 10.

The sections 23 and 24 of the inner shell are secured together, at one side of the shell with hinges 72 and ears 73 and 74, which extend from the opposite side are held together with pins 75. The section 23 is provided with a semi-circular ring section 76 and a similar section 77 is provided on the outer surface of the section 24. The ring formed by the sections 76 and 77 is positioned to receive rollers 78 journaled on pins 79 on the inner surface of the cylinder 10 whereby upon downward movement of the cylinder 10 the rollers engage the ring, forcing the shell into the soil around the tree or plant.

The lower edge of the cylinder 10 is provided with openings 80, as shown in Fig. 7, and similar openings 81 are provided in the upper ends of the sections 23 and 24 whereby the sections of the shell may be connected to the cylinder 10 with chains, as indicated by the numeral 82. The ends of the chains are provided with hooks 83 with which the chains may be hooked into the openings 80 and 81, respectively to suspend the shell from the cylinder whereby upon upward movement of the cylinder the shell is secured thereto with the chains and the shell with a plant or tree, as indicated by the numeral 84 is extracted from the ground. By holding the soil around the roots of the plant in this manner the growth of the tree or shrub is not impaired as the fine roots are not broken.

With trees or shrubbery withdrawn from soil in a nursery or the like, in this manner the tree or plant with the soil around the roots is deposited into a sack or burlap wrapper whereby the soil may be retained around the roots by sewing the wrapper in position, thereby forming a ball.

As illustrated in Figs. 1, 2, and 3 the braces 31 and 32, the supports 33 and 34 and the struts 51 and 52 form a superstructure that is supported from the side beams 25 and 26 of the main frame and from extensions 85 and 86 of the beams, the extensions being supported on the wheels 29 and 30 which are connected to the extensions with an axle 87 and suitable bearings. The ends of the extensions are connected with a cross member 88 and a similar cross member 89 provides connecting means between the ends of the side beams 25 and 26.

The levers 16 and 17 are connected with bolts 90 and 91 through the struts 51 and 52 and these connections are also supported with posts 92 and 93.

The superstructure is illustrated as being connected to the main frame, or side beams and extensions thereof with single pins or bolts, however, it will be understood that these connections may be made by other suitable means.

It will also be understood that modifications, within the scope of the appended claims, may be made in the design and arrangement of the parts without departing from the spirit of the invention.

What is claimed is:

1. A plant balling machine comprising a frame mounted on wheels, a vertically disposed boring cylinder, positioned in said frame, means mounting said boring cylinder in the frame whereby the cylinder is adapted to travel vertically, means for raising and lowering said boring cylinder, means for rotating the boring cylinder, and an inner hollow cylindrical shell positioned in said boring cylinder, the lower end of said boring cylinder and the upper end of the inner hollow cylindrical shell having openings therethrough for receiving fasteners of flexible connecting elements to connect the inner hollow cylindrical shell to the boring cylinder.

2. A tree and shrubbery removing device comprising a horizontally disposed frame, a vertically positioned boring cylinder mounted to travel vertically in the frame, means for elevating and lowering said boring cylinder, means for rotating the boring cylinder, said rotating means being adapted to be connected to a power take-off of a vehicle connected to the frame, an inner shell positioned in the boring cylinder and means for temporarily connecting the inner shell to the boring cylinder whereby the inner shell is lowered and elevated with said boring cylinder.

3. A tree and shrubbery removing device comprising a horizontally disposed frame, a vertically positioned boring cylinder mounted to travel vertically in the frame, means for elevating and lowering said boring cylinder, means for rotating the boring cylinder, said rotating means being adapted to be connected to a power take-off of a vehicle connected to the frame, a pair of complementary hinged semi-circular sections providing an inner shell positioned in said boring cylinder, and means whereby the inner shell is driven downwardly by said boring cylinder, upper end of the inner shell and lower end of the boring cylinder for flexible fastening elements to temporarily connect the inner cylinder to the boring cylinder, whereby said inner shell is elevated by said boring cylinder.

4. In a device for removing trees and shrubbery from the soil, the combination which comprises a substantially horizontally disposed frame mounted on wheels, spaced vertically disposed guide bars extended upwardly from the frame, a cylindrical boring cylinder having teeth on the lower edge and a spiral strip thereon positioned in the frame, means slidably mounting the boring cylinder on said guide bars, means for rotating said boring cylinder, hydraulic cylinders positioned on the frame, means raising and lowering the boring cylinder on the guide bars with said hydraulic cylinders, and a pair of semi-circular sections hinged together providing an inner shell positioned in said boring cylinder, the upper end of the inner shell and the lower end of the boring cylinder having openings for receiving fastening elements therein.

5. In a balling device for trees and shrubbery, the combination which comprises a horizontally disposed frame mounted on wheels, spaced parallel vertically disposed guide bars mounted on said frame, a boring cylinder having teeth on the lower edge and a screw thread on the outer surface positioned between said guide bars, a gear housing having trunnions extended therefrom slidably mounted on said guide bars, means mounting the boring cylinder in said gear housing, a gear mounted on the boring cylinder and positioned in the gear housing, a vertically disposed shaft spaced from said guide bars and journaled on said frame, a pinion on said vertically disposed shaft also positioned in said gear housing and mounted to mesh with the gear in the housing, means whereby the vertically disposed shaft is adapted to be rotated from the power take-off of a vehicle to which the frame is connected, levers pivotally mounted on the frame and having elongated slots in which the trunnions of the gear housing are positioned, hydraulic jacks positioned between the levers and frame, means for pivotally mounting the hydraulic jacks on the frame, means connecting the opposite ends of the hydraulic jacks to the levers, means for supplying fluid under pressure to the jacks for operating the jacks to elevate or lower the gear housing and boring cylinder, and a shell positioned in said boring cylinder, said shell and boring cylinder having openings therethrough and said openings being positioned to receive fastening elements for temporarily connecting the inner cylinder to the boring cylinder.

References Cited in the file of this patent

UNITED STATES PATENTS

| | | |
|---|---|---|
| 462,392 | Bullock | Nov. 3, 1891 |
| 758,781 | Roelofson | May 3, 1904 |
| 1,371,884 | Focks | Mar. 15, 1921 |
| 1,456,983 | Hansen | May 29, 1923 |
| 1,505,346 | Hill | Aug. 19, 1924 |
| 1,589,300 | Meunier | June 15, 1926 |
| 1,600,681 | Lidell | Sept. 21, 1926 |
| 1,628,282 | Sheldon | May 10, 1927 |
| 1,895,901 | Smith | Jan. 31, 1933 |
| 2,084,686 | Howard | June 22, 1937 |
| 2,480,537 | Arps et al. | Aug. 30, 1949 |
| 2,579,712 | Tilden | Dec. 25, 1951 |
| 2,599,770 | Marcerou | June 10, 1952 |